(12) United States Patent
Mitze

(10) Patent No.: US 9,180,562 B2
(45) Date of Patent: Nov. 10, 2015

(54) WHEELSET PRESS

(71) Applicant: MAE Maschinen-und Apparatebau Gotzen GmbH, Erkrath (DE)

(72) Inventor: Manfred Mitze, Wetter (DE)

(73) Assignee: MAE Maschinen-und Apperatebau Gotzen GmbH (DE)

( * ) Notice: Subject to any disclaimer, the term of this patent is extended or adjusted under 35 U.S.C. 154(b) by 0 days.

(21) Appl. No.: 14/581,061

(22) Filed: Dec. 23, 2014

(65) Prior Publication Data

US 2015/0107073 A1    Apr. 23, 2015

Related U.S. Application Data

(63) Continuation of application No. 12/679,122, filed as application No. PCT/EP2008/007547 on Sep. 12, 2008, now Pat. No. 8,967,593.

(30) Foreign Application Priority Data

Sep. 21, 2007    (DE) ..................... 20 2007 013 329 U

(51) Int. Cl.
*A62B 3/00*    (2006.01)
*B23P 19/02*   (2006.01)
*B66F 3/24*    (2006.01)

(52) U.S. Cl.
CPC *B23P 19/021* (2013.01); *B66F 3/24* (2013.01)

(58) Field of Classification Search
USPC ....................................................... 254/93 R
See application file for complete search history.

(56) References Cited

U.S. PATENT DOCUMENTS 2,737,706 A * 3/1956 Isaac et al. ................. 29/898.07
2,878,559 A * 3/1959 Ryan et al. ...................... 29/252

(Continued)

FOREIGN PATENT DOCUMENTS

| CN | 2644075 | 9/2004 |
|----|---------|--------|
| EP | 1201350 | 5/2002 |
| GB | 599034  | 3/1948 |
| JP | 9156302 | 6/1997 |

*Primary Examiner* — Lee D Wilson
*Assistant Examiner* — Alvin Grant
(74) *Attorney, Agent, or Firm* — Fay Sharpe LLP

(57) ABSTRACT

In a wheelset press for pressing or pulling wheels, brake disks or the like on/off axles of rail vehicles, two piston/cylinder units are directed toward one another and stationarily arranged on a common straight line, wherein said piston/cylinder units serve for exerting the required pressing power and, if applicable, for displacing the axle in its longitudinal direction to bring about the pressing-on or pulling-off process. Pressure pistons are provided on the piston/cylinder units to transmit the pressing power onto the facing end of the axle. At least one press abutment for supporting a wheel, a brake disk or the like during the pressing process is designed in such a way that it can be transferred into its support position by means of a relative movement of the axle transverse to its longitudinal direction and otherwise situated outside the press area. The at least one press abutment can be fixed in different positions along the axle. Connecting columns that are rigidly arranged between press beams feature abutments that are axially spaced apart from one another for this purpose. To achieve, among other things, a compact structural shape, the abutments on the connecting columns are realized in the form of slideways for directly accommodating the at least one press abutment, wherein said slideways make it possible to transfer the press abutment from a position outside the press area into a non-tilting support position for the pressing-on or pulling-off process.

31 Claims, 2 Drawing Sheets

(56) References Cited

U.S. PATENT DOCUMENTS

| | | | |
|---|---|---|---|
| 3,189,985 A * | 6/1965 | Hoffmann | 29/714 |
| 3,995,361 A * | 12/1976 | Scheller et al. | 29/251 |
| 4,192,054 A * | 3/1980 | Webb | 29/252 |
| 4,214,363 A * | 7/1980 | Rickrode et al. | 29/802 |
| 4,254,663 A * | 3/1981 | Rickrode et al. | 73/714 |
| 4,771,535 A * | 9/1988 | Abe et al. | 29/802 |
| 6,357,116 B1 * | 3/2002 | Waelchli et al. | 29/894.322 |
| 2012/0047701 A1 * | 3/2012 | Boms et al. | 29/251 |

* cited by examiner

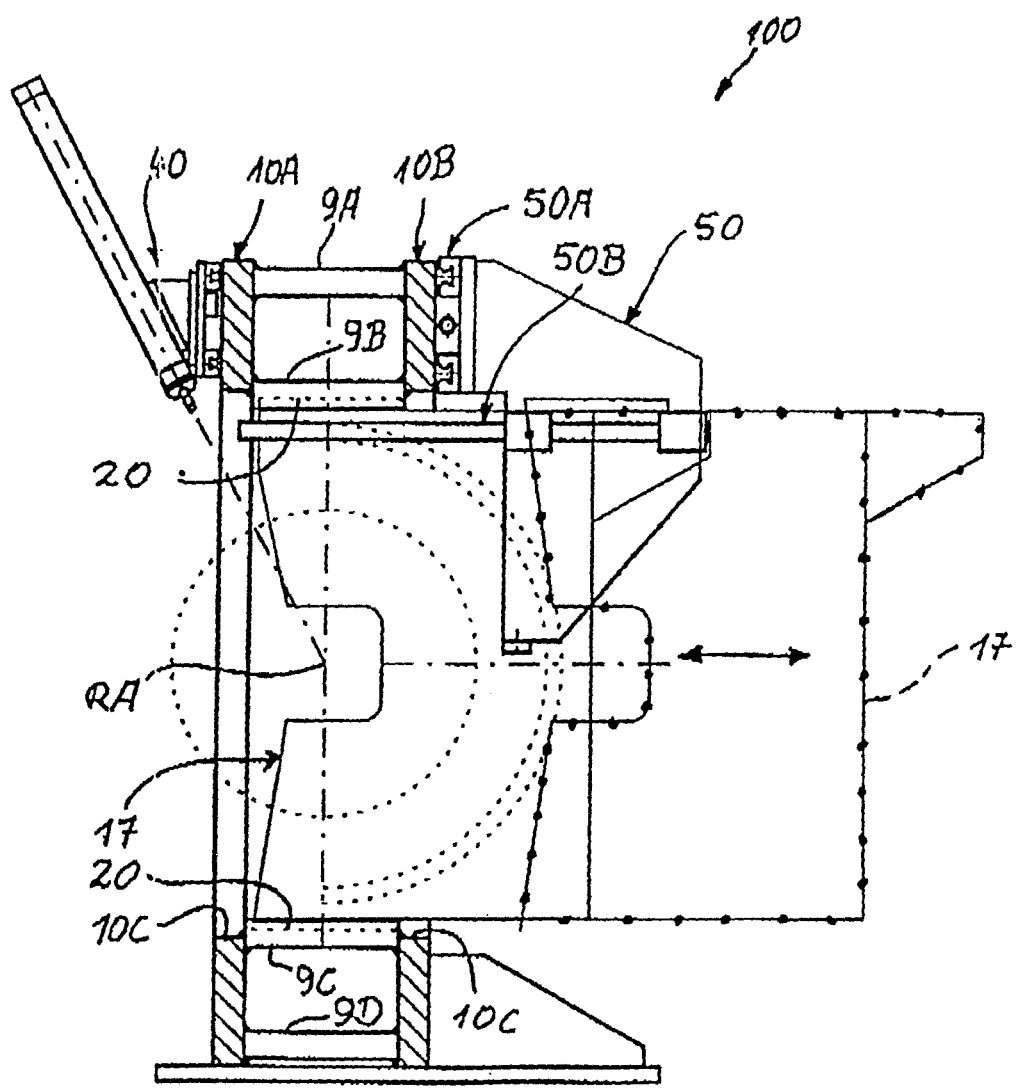

WHEELSET PRESS

The present invention is a continuation of U.S. application Ser. No. 12/679,122 filed Jul. 27, 2011, which claims priority on PCT Application Serial No. PCT/EP08/007547 filed Sep. 12, 2008, which in turn claims priority on German Application Serial No. 20 2007 013 329.4 filed Sep. 21, 2007.

FIELD OF THE INVENTION

The invention pertains to a wheelset press of the type or pressing or pulling wheels, brake disks or the like on/off axles of rail vehicles. Accordingly, two piston/cylinder units that are directed toward one another and stationarily arranged on a common straight line are provided for exerting the required pressing power and, if applicable, for displacing the axle in its longitudinal direction to bring about the pressing-on or pulling-off process. The axle is accommodated by a suitable device of the wheelset press during the pressing process, e.g., by two oppositely arranged centering points, wherein each centering point can be inserted into a centering bore provided on the respective axle end, and wherein means are provided for varying the distance between the centering points. Pressure pistons are provided on the piston/cylinder units to transmit the pressing power onto the facing end of the axle. At least one press abutment for supporting a wheel, a brake or the like during the pressing process is designed in such a way that it can be transferred into its support position by means of a relative movement of the axle transverse to its longitudinal direction and otherwise situated outside the press area. The press abutment can be fixed in different positions along the axle. The piston/cylinder units and the press abutment are arranged in a press frame consisting of so-called press beams and connecting columns rigidly arranged in between.

TECHNOLOGICAL BACKGROUND

The secure joining of wheel disks, brake disks or the like and an axle that is rotatably supported on a rail vehicle in the installed state is of the utmost importance for the reliable operation of the latter. Since the wheels are mostly fixed on the axle by means of a frictional engagement only, an interference fit needs to be produced between the wheel bore and the outside diameter of the axle. The installation of new or reconditioned wheel disks, brake disks or the like on the axle, as well as their removal from the axle after the wear limit is reached, requires high forces on the order of 800 to 2500 kN.

In the following description, the term "wheelset" refers to the axle with all components to be pressed thereon such as wheel disks, brake disks or the like. The term "joining" refers to the assembly of the components or, in other words, pressing the wheel disks, brake disks or the like on the axle, as well as pulling these components off the axle.

Hydraulic presses have the ability to exert high forces over long strokes and therefore are optimally suited for joining wheelsets. Hydraulically operated wheelset presses already were successfully used toward the end of the nineteenth century. With respect to their basic design and their function, wheelset presses known so far essentially correspond to one another and to those used toward the end of the nineteenth century. As an example, we refer to the wheelset press Series PR of the firm Hoesch Maschinenfabrik Deutschland AG. This wheelset press is realized in the form of a horizontally arranged two-column press with a high-pressure cylinder that is driven by hydraulic oil. The high-pressure cylinder is installed in a lateral cylinder beam, in which both columns are also fixed with one end. The other ends of the columns are supported by an end beam that—analogo us to the cylinder beam—is provided with a flange to mount the wheelset press on the floor. The upper ends of the cylinder beam and the end beam frequently carry a bridge crane arrangement that extends essentially parallel to the columns.

Both columns are rotatably supported in the cylinder beam and in the end beam and respectively feature a spindle thread over their free length between the cylinder beam and the end beam. This thread makes it possible to displace a C-shaped traveling beam that serves as abutment and features rotatable nuts with internal threads that are engaged with the spindle threads of the columns. The traveling beam features grooves, into which the actual joining tools that are open toward the front can be inserted.

To join a wheelset by means of this wheelset press, the axle and the component to be joined are initially transferred into the pre-assembly position with the aid of the bridge crane. In this position, the component to be joined is pushed on the axle and arranged such that it can be pressed onto a peripheral collar that forms the interference fit. Subsequently, the axle is manually aligned—while being suspended on the bridge crane—such that its central longitudinal axis and the central longitudinal axis of the press cylinder coincide. In this position, one end of the axle is fixed by means of a spring-loaded centering point that is arranged on the face of the pressure piston of the high-pressure cylinder and engages into a centering bore of the axle while the other end of the axle is fixed by means of a second centering point that can be moved with the aid of a hydraulic cylinder mounted, for example, on the end beam. Before the axle is fixed in position, the traveling beam is displaced in such a way that the tool inserted therein is situated behind the component to be joined referred to the pressing direction.

Subsequently, the actual pressing process is initiated by actuating the high-pressure cylinder to displace the axle in the pressing direction until the component supported on the tool is situated in the desired position on the axle.

To join another component, the axle is then removed from the wheel press by means of the bridge crane and the next component is transferred into its pre-assembly position when pressing on a component or the loosened component is removed when pulling off a component. Subsequently, the tool is moved into the position required for the next pressing process by rotating the nuts provided with threads. The axle with the components is then transferred into the above-described pressing position by the operating personnel—namely once again with the aid of the bridge crane—and the joining process is carried out anew.

In another known wheelset press, the actual press cylinder is installed in the cylinder beam that is connected to the so-called traveling beam, e.g., by means of two round columns, wherein the traveling beam fulfills the function of the abutment and accordingly is supported on the columns in a longitudinally displaceable fashion. It can be locked in several positions with the aid of recesses in the form of round grooves on the columns. This basic design has barely changed over the course of the last hundred years. In North America, in particular, rectangular tie rods are used instead of the round columns, wherein the locking is realized by means of a bolt in these tie rods.

In devices of this type, it is disadvantageous that the wheelset needs to be placed into the wheelset press and removed again several times with the aid of the bridge crane before all joining processes are completed, namely because this drastically increases the costs for joining wheelsets due to the required personnel. Since the components can be extremely heavy and are manually placed into the wheelset press, the risk of injuries to the operating personnel also should not be underestimated.

One decisive additional development of the traditional basic design was the fully automated wheelset press disclosed by the applicant in EP 1 201 350 B1 wherein the press frame is composed of vertical press beams and horizontal connection columns. The significant innovation of this wheelset press was that the U-shaped opening in the traveling beam was so large that the traveling beam could be displaced into all press positions over an entire wheelset fixed between the centering points, wherein the actual pressing tool was transferred on the traveling beam from a pressing position into a displacing position transverse to the axial direction for this purpose. This made it possible to significantly reduce the cycle times. In contrast to traditional solutions, however, the width of the U-shaped opening in the traveling beam needs to be significantly increased to displace the beam over all wheelset components. Consequently, the "basic insert" that serves as a receptacle for the actual pressing tool and can be transversely displaced is substantially larger than in traditional solutions. An upper and a lower connecting beam absorb the longitudinal forces between the cylinder beams on the ends, wherein the lower connecting beam is arranged below the floor such that its upper side ends flush with the floor. Keys are installed in the traveling beam and can be inserted into the lower and the upper connecting beam in the respectively desired pressing position to fix the traveling beam in the pressing position. The prior art only shows a type of press frame which is composed of cylinders or press beams and horizontal columns that are connected to one another.

SUMMARY OF THE INVENTION

The invention is based on the objective of proposing a wheelset press, in which the advantages of placing a wheelset into the press only once for all joining steps are combined with the cost advantages of traditional wheelset presses. To attain this objective, improved wheelset press is proposed. In a generic wheelset press, the abutments in the connecting columns rigidly arranged between the press beams are accordingly realized in the form of slideways for directly accommodating and displacing the at least one press abutment from a position outside the press area into a non-tilting support position of the at least one press abutment for the pressing-on or pulling-off process. Consequently, the invention eliminates a traveling beam with U-shaped opening for accommodating the wheelset. Instead, press abutments can simply be inserted into slideways of the press frame in a register-like fashion. To fix a press abutment in other axial positions, the abutment is removed from the slideway transverse to the axial direction, transported into another working position in the axial direction and then reinserted into another slideway of the press frame at this location.

The invention allows an exceptionally compact design of the wheelset press. The clear distance between the upper and the lower connecting column can be reduced to a size that is only slightly larger than the largest diameter of a wheelset to be joined. However, all advantages of a fully automated and efficient work cycle are achieved, wherein the wheelset only needs to be placed into the press once.

In the context of the invention, the term "connecting columns" refers to any suitable tension transmitting means between the press beams that carry the piston/cylinder units. Furthermore, "directly" accommodating the press abutments in the slideways of the connecting columns refers, according to the invention, to the elimination of a traveling beam that is effective between the connecting columns and the press abutment during the joining process. It is therefore possible that the at least one press abutment used in connection with the slideways consists of several parts. The press abutment can also accommodate a tool that is adapted to the component to be joined in the area of the pressing point.

The invention can be realized in different ways:

A particularly simple wheelset press design of independent inventive significance is realized if the press frame (or machine frame) consists of at least one approximately O-shaped component that fulfills the function of the cylinder beam and the connecting columns. This lowers the expenditures for joining surfaces and component connections and therefore also the machine installation. The wheelset press consequently is very rigid and does not require complicated on-site adjustments. The structural depth can be maintained very small such that the access for operating personnel, as well as the placement of wheelset into the press and the removal therefrom, is simplified. Two plate-like, O-shaped components may, in particular, be laterally spaced apart and connected into a frame of predetermined thickness. The piston/cylinder units can then be placed into the space between the plate-like components. Slideways of sufficient length can be provided in the connecting elements between the plate-like components in this case.

In the joining position, the abutments are secured against displacements transverse to the axle.

For example, a carriage that can be displaced on one side of the press frame maybe provided for displacing the press abutments transverse to the axial direction and into another axial position. A precision spindle drive makes it possible to displace this carriage very quickly and exactly into the respective inserting position for the at least one press abutment. Measuring arrangements for monitoring the press positions can also be displaced on the press frame.

The aforementioned components, as well as the claimed components and the components described in the exemplary embodiments and to be used in accordance with the invention, are not subject to any special exceptions with respect to their size, shape, material selection and technical design such that the selection criteria known in the field of application can be used in an unrestricted fashion.

In summary, the invention is directed to a wheelset press for pressing or pulling wheels, brake disks or the like on/off axles of rail vehicles. The wheelpress has two piston/cylinder units that are directed toward one another and stationarily arranged on a common straight line. The piston/cylinder units serve for exerting the required pressing power and, if applicable, for displacing the axle in its longitudinal direction to bring about the pressing-on or pulling-off process. The wheelset press also includes a device for accommodating the axle in the wheelset press during the pressing process such as two oppositely arranged centering points. Pressure pistons are provided on the piston/cylinder units to transmit the pressing power onto the facing end of the axle. The wheelset press also includes a press abutment that serves for supporting a wheel. A brake disk or the like during the pressing process and is designed in such a way that it can be transferred into its support position by means of a relative movement of the axle transverse to its longitudinal direction and otherwise situated outside the press area, wherein the at least one press abutment can be fixed in different positions along the axle. The wheelset press also includes connecting columns that are rigidly arranged between press beams and carry abutments that are axially spaced apart from one another. The abutments are realized in the form of slideways for directly accommodating and displaceably transferring the at least one press abutment from a position outside the press area into a non-tilting support position of the at least one press abutment for the pressing-on or pulling-off process. The press frame optionally consists of at least one component that has the shape of an O if viewed from the side. The O-shaped components can be optionally spaced apart from one another and connected to one another by means of connecting elements. The slideways are optionally provided on the connecting elements. The wheelset press can optionally include a carriage arrangement for inserting the press abutments into the slideways and removing the press abutments transverse to the axial direction, as well as for displacing the press abutments in the axial direction. At least one measuring arrangement can be optionally displaced along one of the connecting columns.

Other details, characteristics and advantages of the object of the invention result from the dependent claims, as well as the following description of the corresponding drawing or table, in which an—exemplary—embodiment of a wheelset press is illustrated.

BRIEF DESCRIPTION OF THE FIGURES

In the drawings,

FIG. 2 shows a section through the same wheelset press along the line II-II in FIG. 1.

DETAILED DESCRIPTION OF AN EXEMPLARY EMBODIMENT

Figure 1:
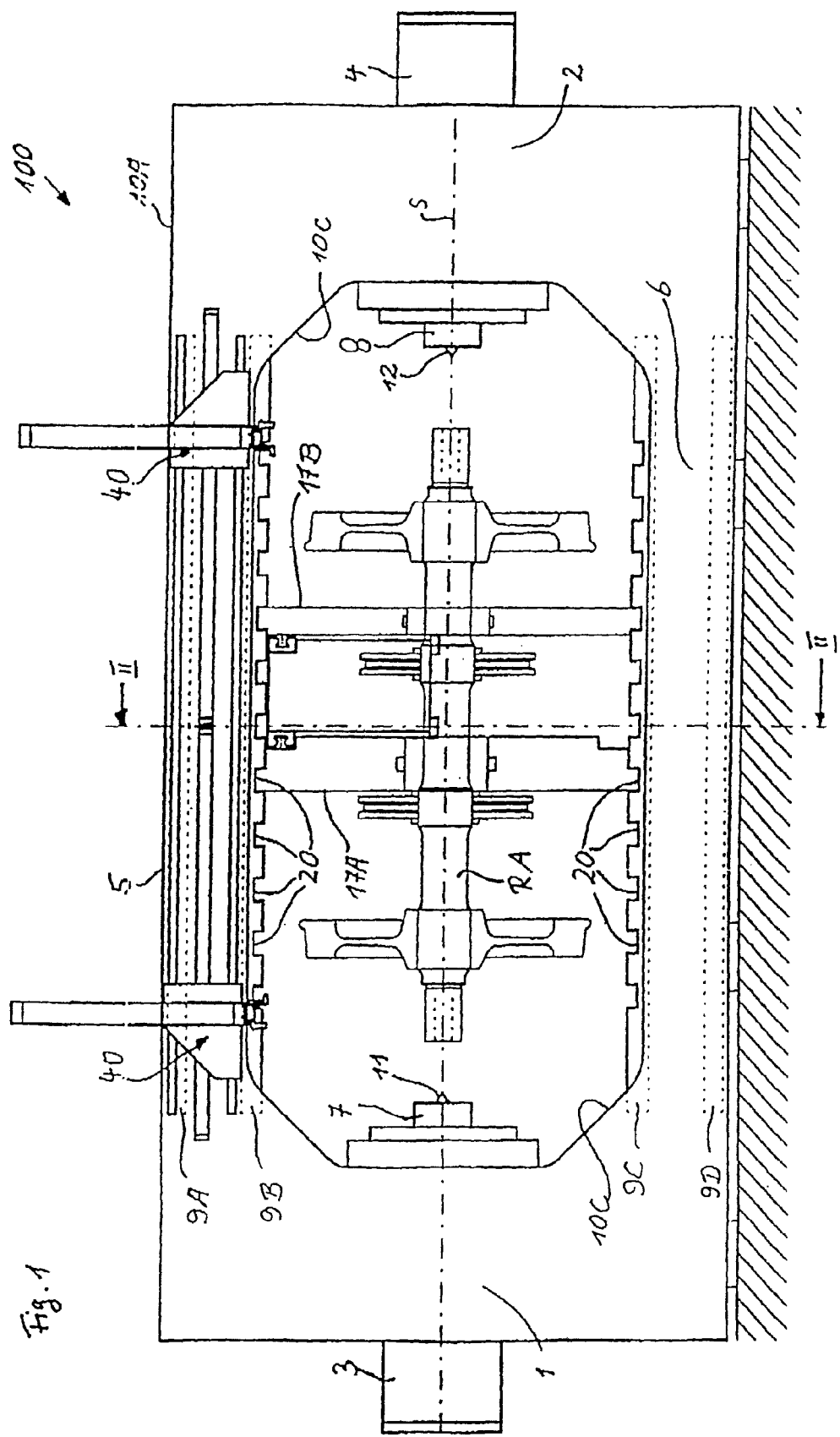
FIG. 1 shows a side view of a wheelset press.

The wheelset press 100 illustrated in the figures features a press frame that consists of vertical frame elements 1 and 2 and horizontal connecting columns 5 and 6. These are combined into two steel plates 10A, 10B that are O-shaped if viewed from the side and spaced apart from one another. Horizontal connecting elements 9A-9D (FIG. 2) serve for spacing apart and connecting these steel plates. They also create space for respectively arranging a piston/cylinder unit 3, 4 with facing centering points 11 and 12 and pressure pistons 7, 8 on each side of the press.

The wheelset press can be placed and anchored on level ground. A carriage arrangement 50 can be displaced on one side of the upper connecting column 5 with the aid of corresponding longitudinal guides 50A and a spindle drive. This carriage carries one or more press abutments 17A, 17B such that they can be displaced transverse to the axle RA with the aid of transverse guides 50B. Consequently, the press abutments can be transferred between a working or joining position and a displacing position as indicated with dot-dash lines in FIG. 2. The connecting elements 9B, 9C facing the O-shaped opening 10C feature adjacent slideways 20 that are spaced apart from one another and extend transverse to the axle RA, wherein these slideways make it possible to insert the press abutments 17A, 17B into the joining position and to remove the abutments transverse to the axial direction. They are situated vertically on top of one another and serve as abutments, in which the press abutments 17A, 17B are supported. FIG. 1 shows two press abutments in different axial positions.

A measuring arrangement 40 is arranged opposite of the carriage arrangement on the upper connecting column such that it can be displaced parallel to the axial direction.

The press functions by placing a wheelset into the position between the centering points. After the wheelset is fixed between the centering points, the entire wheelset can be axially displaced by means of the piston/cylinder units 3, 4. The pressing-on or pulling-off process is conventionally carried out when an abutment 17A or 17B is situated in its working position.

LIST OF REFERENCE SYMBOLS

1 Press beam
2 Press beam
3 Piston/cylinder unit
4 Piston/cylinder unit
5 Connecting column
6 Connecting column
7 Pressure piston
8 Pressure piston
9A-9D Connecting elements
10A/B O-shaped plates
11 Centering point
12 Centering point
17A/B Press abutments
20 Slideways
40 Measuring arrangement
50 Carriage arrangement
50A Longitudinal guides
50B Transverse guides
100 Wheelset press
RA Axle
S Straight line

The invention claimed is:

1. A wheelset press for pressing or pulling wheels or brake disks on/off an axle of rail vehicles, the wheelset press comprising:
at least one piston/cylinder unit is stationarily and non-movably arranged on a common straight line, wherein said piston/cylinder unit includes a movable pressure piston that serves for exerting a required pressing power for displacing the axle in a longitudinal direction of the piston/cylinder unit to bring about a pressing-on or pulling-off process,
a device for accommodating the axle in the wheelset press during the pressing process, wherein the pressure piston is provided on the at least one piston/cylinder unit to transmit pressing power onto a facing end of the axle,
at least one press abutment, said at least one press abutment is designed for supporting the wheel or the brake disk during the pressing process and is designed in such a way that the at least one press abutment can be transferred into a support position by means of a relative movement of the press abutment transverse to a longitudinal direction of the axle and otherwise situated outside a press area, wherein the at least one press abutment can be fixed in different positions along a longitudinal direction of the axle, and
connecting columns that are rigidly arranged between press beams and carry multiple abutments for the at least one press abutment that are axially spaced apart from one another,
characterized by the fact that
the multiple abutments for the at least one press abutment are configured in the form of slideways for directly accommodating and displaceably transferring the at least one press abutment from a position outside the press area into a non-tilting support position of the at least one press abutment for the pressing-on or pulling-off process.

2. The wheelset press as defined in claims 1, wherein a press frame includes at least one component that has an "O" shape if viewed from the side.

3. The wheelset press as defined in claim 2, wherein two "O"shaped components are spaced apart from one another and connected to one another by means of connecting elements.

4. The wheelset press as defined in claim 3, wherein the slideways are provided on the connecting elements.

5. The wheelset press as defined in claim 1, further including a carriage arrangement for inserting the at least one press abutment into the slideways and enabling removal of the at least one press abutment transverse to the axial direction and movement of said at least one press abutments in the axial direction.

6. The wheelset press as defined in claim 1, further including at least one measuring arrangement that can be positioned along one of the connecting columns.

7. A wheelset press for pressing wheels or disks on or pulling wheels or brake disks off an axle of a rail vehicle, said wheelset press comprising:
   a) two piston or cylinder units that are directed toward one another, are stationary and non-movably arranged relative to one another, and are arranged on a common straight line, said piston or cylinder units designed to exert a required pressing power to bring about said pressing-on or pulling-off process for said wheel or disks;
   b) an engagement device for engaging said axle at each end of said axle so as to maintain said axle in position during said pressing-on or pulling-off process, said engagement device including two pressure pistons on said piston or cylinder units to transmit pressing power onto each end of said axle;
   c) first and second press abutments that are designed to support said wheel or brake disk during said pressing-on or pulling-off process, said first and second press abutments designed to be transferred into a support position of said press abutments by means of a relative movement of said press abutments transverse to a longitudinal direction of said axle and otherwise situated outside a press area, each of said first and second press abutments can be moved independently of one another and are designed to be fixed in different positions along said axle; and,
   d) connecting columns that are rigidly arranged between press beams and carry abutments that are axially spaced apart from one another; said abutments are in the form of slideways for directly accommodating and displaceably transferring said first and second press abutments from a position outside a press area into a non-tilting support position of said press abutments for said pressing-on or pulling-off process.

8. The wheelset press as defined in claim 7, wherein said engagement device engages said axle at a center point on each of said ends of said axle.

9. The wheelset press as defined in claims 7, wherein said press frame includes at least one component that has an "O" shape if viewed from the side.

10. The wheelset press as defined in claims 8, wherein said press frame includes at least one component that has an "O" shape if viewed from the side.

11. The wheelset press as defined in claim 9, wherein said press frame includes two "O" shaped components, said "O" shaped components spaced apart from one another and connected to one another by connecting elements.

12. The wheelset press as defined in claim 10, wherein said press frame includes two "O" shaped components, said "O" shaped components spaced apart from one another and connected to one another by connecting elements.

13. The wheelset press as defined in claim 11, wherein said slideways are positioned on said connecting elements.

14. The wheelset press as defined in claim 12, wherein said slideways are positioned on said connecting elements.

15. The wheelset press as defined in claim 14, further including a carriage arrangement for inserting said press abutments into said slideways, said carriage arrangement designed to move said press abutments transverse to said axial direction of said axle, said carriage arrangement designed also to move said first and second press abutments along said axial direction of said axle.

16. The wheelset press as defined in claim 15, further including at least one measuring arrangement positioned along one of said connecting columns.

17. The wheelset press as defined in claim 7, further including at least one measuring arrangement positioned along one of said connecting columns.

18. A wheelset press for pressing wheels or disks on or pulling wheels or brake disks off an axle of a rail vehicle, said wheelset press comprising:
   a) two piston or cylinder units that are directed toward one another and arranged on a common straight line, said piston or cylinder units designed to exert a required pressing power to bring about said pressing-on or pulling-off process for said wheel or disks;
   b) an engagement device for engaging said axle at each end of said axle so as to maintain said axle in position during said pressing-on or pulling-off process, said engagement device including two pressure pistons on said piston or cylinder units to transmit pressing power onto each end of said axle;
   c) a press abutment that is designed to support said wheel or brake disk during said pressing-on or pulling-off process, said press abutment designed to be transferred into a support position of said press abutment by means of a relative movement of said press abutment transverse to a longitudinal direction of said axle and otherwise situated outside a press area, at least one press abutment is designed to be fixed in different positions along said axle;
   d) a carriage arrangement for inserting said press abutment into slideways, said carriage arrangement designed to move said press abutment transverse to said axial direction of said axle, said carriage arrangement designed also move said press abutment along said axial direction of said axle, and,
   e) connecting columns that are rigidly arranged between press beams and carry abutments that are axially spaced apart from one another; said abutments are in the form of said slideways for directly accommodating and displaceably transferring at least one of said press abutment from a position outside the press area into a non-tilting support position of said at least one press abutment for said pressing-on or pulling-off process.

19. The wheelset press as defined in claim 18, further including at least one measuring arrangement positioned along one of said connecting columns.

20. A wheelset press for pressing or pulling wheels or disks on/off axles of vehicles, said wheelset press comprising:
   at least one piston/cylinder unit that are directed toward one another and stationarily and non-movably arranged on a common straight line, wherein said piston/cylinder units serve for exerting the required pressing power for displacing the axle in a longitudinal direction of said piston/cylinder units to bring about the pressing-on or pulling-off process, a device for accommodating the axle in the wheelset press during the pressing process, wherein pressure pistons are provided on the piston/cylinder units to transmit the pressing power onto the facing end of the axle, at least one press abutment that serves for supporting the wheel or the disk during the pressing process and are designed in such a way that the first and second press abutments can be transferred into a support position relative movement of said at least one press abutment transverse to a longitudinal direction of the axle and otherwise situated outside a press area, wherein the first and second press abutments can each be fixed in different positions along the axle and moved independently of one another, and, with connecting columns that are rigidly arranged between press beams and carry abutments that are axially spaced apart from one another, characterized by the fact that the press frame includes at least one component that has the shape of an "O" when viewed from the side, said component fulfilling the function of the press beams and the connecting columns.

21. The wheelset press as defined in claim 20, wherein two "O" shaped components are spaced apart from one another and connected to one another by means of connecting elements.

22. The wheelset press as defined in claim 21, wherein the slideways are provided on the connecting elements.

23. The wheelset press as defined in claim 20, further including a carriage arrangement for inserting the at least one press abutment into the slideways and enabling removal of the first and second press abutments transverse to the axial direction, and enabling movement of said at least one press abutment in the axial direction.

24. The wheelset press as defined in claim 21, further including a carriage arrangement for inserting the first and second press abutments into the slideways and enabling removal of said at least one press abutment transverse to the axial direction, and enabling movement of the first and second press abutments in the axial direction.

25. The wheelset press as defined in claim 20, further including at least one measuring arrangement that can be displaced along one of the connecting columns.

26. The wheelset press as defined in claim 23, further including at least one measuring arrangement that can be positioned along one of the connecting columns.

27. A wheelset press for pressing or pulling wheels or brake disks on/off an axle of a vehicle, the wheelset press comprising:

at least one piston/cylinder is stationarily and non-movably arranged on a common straight line, wherein said piston/cylinder unit includes a movable pressure piston that serves for exerting a required pressing power for displacing the axle in a longitudinal direction of the piston/cylinder unit to bring about a pressing-on or pulling-off process;

a device for accommodating the axle in the wheelset press during the pressing process, the pressure piston is provided on the at least one piston/cylinder unit to transmit pressing power onto a facing end of the axle; and, at least one press abutment, said at least one press abutment is configured for supporting the wheel or the brake disk during the pressing process, the at least one press abutment is configured to be movable transverse to the longitudinal direction of the axle so that the at least one press abutment can be fixed in different positions along the longitudinal direction of the axle, the movement of the at least one press abutment in the direction transverse to the longitudinal direction of the axle causing the at least one press abutment to be situated outside the press area, the at least one press abutment moveable in the longitudinal direction of the axle when the at least one press abutment is situated outside the press area.

28. The wheelset press as defined in claim 27, further including connecting columns that are rigidly arranged between press beams and carry multiple abutments for the at least one press abutment, the multiple abutments are axially spaced apart from one another, the multiple abutments are configured in the form of slideways for accommodating the at least one press abutment to enable the at least one press abutment to be movable transverse to the longitudinal direction of the axle, the slideways configured to support the least one press abutment in a non-tilting support position for the pressing-on or pulling-off process.

29. The wheelset press as defined in claim 28, further including a carriage arrangement for inserting the at least one press abutment into the slideways, the carriage arrangement designed to move the at least one abutment transverse to the axial direction of the axle, the carriage arrangement designed also to move the at least one press abutment along the axial direction of said axle.

30. The wheelset press as defined in claims 29, wherein a press frame includes two "O" shaped components that are spaced apart from one another and connected to one another by means of connecting elements, the slideways are provided on the connecting elements.

31. The wheelset press as defined in claim 30, further including at least one measuring arrangement that can be displaced along one of the connecting columns.

* * * * *